United States Patent [19]

Klotz

[11] Patent Number: 5,292,697
[45] Date of Patent: Mar. 8, 1994

[54] NONDESTRUCTIVE TRIVALENT CATION EXCHANGE OF MOLECULAR SIEVES

[75] Inventor: Marvin R. Klotz, Batavia, Ill.

[73] Assignee: Amoco Corporation, Chicago, Ill.

[21] Appl. No.: 980,586

[22] Filed: Nov. 23, 1992

[51] Int. Cl.⁵ .................. B01J 29/00; B01J 37/30
[52] U.S. Cl. ............................ 502/73; 423/112
[58] Field of Search ............ 502/73, 86, 62; 423/112

[56] References Cited

U.S. PATENT DOCUMENTS

| | | | |
|---|---|---|---|
| 3,405,055 | 10/1968 | Bittner | 502/62 |
| 3,836,561 | 9/1974 | Young | 502/73 |
| 3,962,132 | 6/1976 | Haschke et al. | 502/62 |
| 4,166,097 | 8/1979 | Johnson | 423/112 |
| 4,175,057 | 11/1979 | Davies et al. | 423/112 |
| 5,059,567 | 10/1991 | Linsten et al. | 423/112 |

*Primary Examiner*—Carl F. Dees
*Attorney, Agent, or Firm*—Thomas A. Yassen; Richard A. Kretchmer

[57] ABSTRACT

A method is provided for the nondestructive trivalent cation ion exchange of molecular sieves comprising ion exchanging at least one molecular sieve with at least one trivalent cation, wherein the ion exchange is performed at ion exchange conditions with an ion exchange solution comprising the trivalent cation, a trivalent cation complexing agent, and a suitable amount of a hydroxide-producing component to form an ion exchange solution having a pH ranging from about 4 to about 8.

20 Claims, No Drawings

NONDESTRUCTIVE TRIVALENT CATION EXCHANGE OF MOLECULAR SIEVES

BACKGROUND OF THE INVENTION

This invention relates to an improved method of making or modifying molecular sieves and molecular sieve-based catalysts. More particularly, this invention relates to an improved method for the nondestructive ion exchange of molecular sieves using an ion exchange solution comprising a trivalent cation, a trivalent cation complexing agent, and a sufficient amount of a hydroxide-producing component to form an ion exchange solution having a pH ranging from about 4 to about 8.

Natural and synthetic crystalline molecular sieves are generally useful as catalysts and adsorbents. These molecular sieves have distinct crystal structures which are demonstrated by X-ray diffraction. The crystal structure defines cavities and pores which are characteristic of the different species. The adsorptive and catalytic properties of each molecular sieve are determined in part by the dimensions of its pores and cavities. Thus the utility of a particular molecular sieve for a particular application depends at least partly on its crystal structure. Because of their unique molecular sieving characteristics, as well as their catalytic properties, crystalline molecular sieves are particularly useful in such applications as gas drying, physical separation, and hydrocarbon conversion processes. Although many different molecular sieves and methods of making and modifying these sieves have been disclosed in the prior art, there continues to be a need for still better and improved molecular sieves and methods for making and modifying such molecular sieves.

Synthetic molecular sieves are often prepared from mixtures containing alkali metal hydroxides and therefore, can have alkali metal contents of 1 percent by weight or more. The ion exchange of various metals or ammonium ion for such alkali metals is generally performed in catalysis in order to obtain active sites that will facilitate particular catalytic reactions. For example, ion exchange of other metal cations or ammonium ion for such alkali metals can be performed to modify catalyst acidity subject to the particular reactions desired and the feedstock and operating condition constraints inherent to the process for conducting these reactions. In other cases, ion exchange of other metal cations or ammonium ion for such alkali metals can be performed to obtain a particular type of activity or selectivity conductive to catalyzing a particular type or degree of reaction. Typical exchangeable alkali metals include sodium or potassium in the sieve and such an ion exchange can be performed with components such as ammonium nitrate or acetate, followed by a subsequent heating step for releasing ammonia, wherein a proton remains at the exchangeable site. This type of ion exchange generally leaves the molecular sieve in the "hydrogen form."

For purposes of the present invention, the term "ion exchange" shall mean the method of changing one cation for another cation at the ion exchangeable sites in the pores of the molecular sieve. This term does not refer to the elemental replacement of one framework element by another potential framework element. Framework elements are generally those elements that are tetrahedrally bonded through oxygen to each other for providing the typical molecular sieve framework.

Similarly, the term "ion exchangeable sites" shall mean the site(s) in a molecular sieve occupied by the cation that balances the negative charge of the electron rich framework tetrahedra.

Metal cation ion exchanges such as aluminum ion exchange can also be performed and generally involve the addition of a molecular sieve to an ion exchange solution comprising a metal salt such as aluminum nitrate and water as exemplified by the following example:

Below a pH of about 4

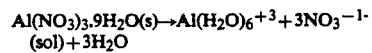

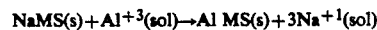

where MS is a molecular sieve, Na and Al are the sodium and aluminum ions respectively, and where (s) and (sol) designate the solid species and species dissolved in solution respectively.

Trivalent cation ion exchange can be particularly beneficial, compared to divalent and monovalent cation ion exchange, due to advantages in molecular sieve stability and enhanced activity and selectivity.

However, it is generally known in the prior art that trivalent cation ion exchanges with aluminum can be very difficult to effect. See Carvajal, Chu, and Lunsford, The Role of Polyvalent Cations in Developing Strong Acidity: A Study of Lanthanum-Exchanged Zeolites, Journal of Catalysis 125, 123–131 (1990). In Dealumination of Large Crystals of Zeolite ZSM-5 by Various Methods by Kornatowski, Rozwadowski, Schmitz, and Cichowlas, J. Chem. Soc., Faraday Trans., 88(9), 1339–43, it is noted that ion exchange of ZSM-5 with $Al^{+3}$ by using aqueous solutions of Al salts is impossible. The salts of metallic cations, and particularly the trivalent cations such as aluminum, generally form acidic solutions when dissolved in water. For example, the pH of aluminum nitrate generally ranges from about 1 to about 3. Maintaining a low trivalent cation ion exchange solution pH is generally necessary to keep the aluminum in solution. Where the pH of the ion exchange solution comprising an aluminum trivalent cation is increased beyond a level of about 4, the lower solution acidity creates a competition between the aluminum ion exchange reaction and hydroxide ion wherein the aluminum cation can form the colloidal hydroxide and precipitate from the ion exchange solution according to the following reactions:

Above a pH of about 4

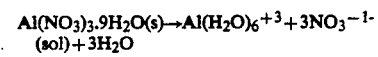

It is generally the formation of the aluminum hydroxide precipitate that will not allow aluminum ion exchange to occur above a pH of about 4. Therefore, practicality has historically dictated that such molecular sieve ion exchanges using trivalent cations be conducted at a pH of below 4.

However, molecular sieve ion exchange using ion exchange solutions having a pH of less than 4 can cause the framework aluminum of a zeolite to be acidically leached from the silicon framework. For non-zeolitic molecular sieves such as a borosilicate or a gallosilicate, the framework boron or gallium can similarly be acidically leached from the silicon framework. Since this leaching effect generally reduces the number of exchangeable sites in the molecular sieve, the level of possible trivalent cation ion exchange is also reduced. This leaching effect generally results in a less acidic sieve and can be undesirable to the catalyst manufacturer or commercial user of the catalyst. With some zeolites, a pH of less than 4 can cause the general collapse of the framework and result in an amorphous material.

Therefore, there is a great need in catalysis, for a method for trivalent cation ion exchange of molecular sieves that avoids the problems inherent to the methods of the prior art and does not acidically leach framework metals from the molecular sieve.

Conventional methods for the ion exchange of molecular sieves, and in particular, the zeolites are disclosed in Zeolite Molecular Sieves, Donald W. Breck, John Wiley & Sons at pages 529-580 (1974).

Ion-exchange of cations into zeolite, and particularly the Y zeolite, has also been studied extensively, including work by H. S. Sherry in J. Phys. Chem. (1968) 72, 4086 and in Advan. Chem. Ser. (1971) 101, 350.

Lactic acid has been used in catalysis for templating zeolite synthesis. For example, U.S. Pat. No. 4,511,547 to Iwayama et al. and U.S. Pat. No. 4,581,216 to Iwayama et al. disclose the use of lactic acid for the formation of zeolites where the cation-lactate is a space-filling material around which the zeolite is crystallized. The lactic acid in the Iwayama et al. references is provided for templating the zeolite during formation and is not used for zeolite modification or for the ion exchange of the zeolite subsequent to formation.

It has now been found that trivalent cation ion exchange of molecular sieves can be performed while minimizing the adverse effects of framework metal leaching by complexing the trivalent cation in a manner so as to keep it from precipitating from the ion exchange solution when the pH of the solution is increased.

It has also been found that increasing the pH of the ion exchange solution to a level ranging from about 4 to about 8, in accordance with the method of the present invention, results in effective ion exchange while substantially minimizing leaching of the framework metal and the reduction in ion exchangeable sites caused by such leaching.

It has also been found that when using the particular complexing solution of the present invention comprising one or more of the alpha, beta, and gamma hydroxy- and amino-carboxylic acids and some crown ethers as exemplified by lactic acid, tartaric acid, glycine, and 15-crown-5, and equivalents thereof, the complexed trivalent cation can generally continue to enter the pores of the molecular sieve and gain access to the exchangeable sites.

It has also been found that when using the particular complexing solution of the present invention comprising one or more of the alpha, beta, and gamma hydroxy- and amino-carboxylic acids and some crown ethers as exemplified by lactic acid, tartaric acid, glycine, and 15-crown-5, and equivalents thereof, the complexed trivalent cation can be effectively released to the molecular sieve exchangeable sites.

It is therefore an object of the present invention to provide a method for the effective trivalent ion exchange of molecular sieves.

It is another object of the present invention to provide a method for effective trivalent ion exchange of molecular sieves at a pH above 4.

It is another object of the present invention to provide a method for trivalent ion exchange of molecular sieves which reduces the level of acidic leaching of framework metals over prior art methods.

Other objects appear herein.

SUMMARY OF THE INVENTION

The above objects can be attained by providing a method for the nondestructive trivalent cation ion exchange of molecular sieves comprising ion exchanging at least one molecular sieve with at least one trivalent cation, wherein the ion exchange is performed at ion exchange conditions with an ion exchange solution comprising the trivalent cation, a trivalent cation complexing agent, and a suitable amount of a hydroxide-producing component to form an ion exchange solution having a pH ranging from about 4 to about 8.

The method of the present invention facilitates modification or ion exchange of any one or more of numerous molecular sieves with any one or more of several trivalent cations. Wherein the trivalent cation is aluminum, the method of the present invention can achieve increases in the level of exchangeable site aluminum compared to prior art methods.

The method of the present invention facilitates trivalent cation ion exchange of molecular sieves at a pH above 4. Where prior art methods for trivalent cation exchange generally required a pH of less than 4, the method of the present invention permits and utilizes a pH of greater than 4 and preferably from 4 to about 8 in order to reduce framework metal leaching and increase catalyst activity and selectivity. The method of the present invention can reduce framework element losses by weight by more than 20 percent compared to prior art ion exchange methods.

BRIEF DESCRIPTION OF THE INVENTION

The method of the present invention can be utilized with substantially all molecular sieves including the naturally-occurring and synthetic non-zeolitic molecular sieves such as gallosilicate and borosilicate and the naturally-occurring and synthetic zeolitic molecular sieves.

The zeolites are crystalline aluminosilicates that possess a cage-network structure with pores of a few angstroms in diameter. Some of the common materials, such as zeolite Y (faujasite) have a three dimensional structure with pore intersections ("supercages") generally larger than the pore size. Other zeolites such as zeolite L, have channels with diffusional cross connections. For each type of zeolite, a theoretical crystal structure or "framework" can be specified which is composed of interconnected silicon atoms, aluminum atoms, and oxygen atoms arranged in an ordered manner. The aluminum found within this zeolitic framework is referred to as "framework aluminum." A typical zeolitic framework comprises corner-sharing $SiO_4$ and $AlO_4$ tetrahedra. Charge deficiencies in the Si-O-Al framework are balanced by the presence of suitable positive ions such as ions of hydrogen, ammonium, alkali metal, alkaline earth metal, and rare earth metal.

Essentially any crystalline aluminosilicate can be modified or processed with the method of the present invention. The zeolites can include both synthetic and naturally occurring zeolites. Illustrative of the synthetic zeolites are Zeolite X, U.S. Pat. No. 2,882,244; Zeolite Y, U.S. Pat. No. 3,130,007; Zeolite A, U.S. Pat. No. 2,882,244; Zeolite L, Bel. 575,117; Zeolite D, Can. 611,981; Zeolite R, U.S. Pat. No. 3,030,181; Zeolite S, U.S. Pat. No. 3,054,657; Zeolite T, U.S. Pat. No. 2,950,952; Zeolite Z, Can. 614,995; Zeolite E, Can. 636,931; Zeolite F, U.S. Pat. No. 2,995,358; Zeolite O, U.S. Pat. No. 3,140,252; Zeolite W, U.S. Pat. No. 3,008,803; Zeolite Q, U.S. Pat. No. 2,991,151; Zeolite M, U.S. Pat. No. 2,995,423; Zeolite H, U.S. Pat. No. 3,010,789; Zeolite J, U.S. Pat. No. 3,001,869; Zeolite W, U.S. Pat. No. 3,012,853; Zeolite KG, U.S. Pat. No. 3,056,654; Zeolite SL, Dutch 6,710,729; Zeolite Omega, Can. 817,915; Zeolite U.S. Pat. No. ZK-5, 3,247,195; Zeolite Rho, Proc. Sixth Intern. Zeolite Conf., Olson and Bisio, Eds., 812-822, 1983; Zeolite Beta, U.S. Pat. No. 3,308,069; Zeolite ZK-4, U.S. Pat. No. 3,314,752; Zeolite ZSM-5, U.S. Pat. No. 3,702,886; Synthetic Mordenite; Ultrastable Zeolites, U.S. Pat. Nos. 3,293,192 and 3,449,070; and the references cited therein. Other synthetic zeolites are described in the book "Zeolite Molecular Sieves-Structure, Chemistry, and Use," by Donald W. Breck, 1974, John Wiley & Sons, which is hereby incorporated by reference.

Illustrative of naturally occuring crystalline zeolites are analcime, bikitaite, edingtonite, epistilbite, levynite, dachiardite, erionite, faujasite, analcite, paulingite, noselite, ferrierite, heulandite, scolecite, stilbite, clinoptilolite, harmotone, phillipsite, brewsterite, flakite, datolite, chabazite, gmelinite, cancrinite, leucite, lazurite, scolecite, mesolite, ptilolite, mordenite, nepheline, natrolite, scapolite, thomsonite, gismondine, garronite, gonnardite, merlinolite, laumontite, offretite, and yugawaralite. Descriptions of illustrative naturally occurring zeolites are found in the aforementioned book by Breck and in the book "Molecular Sieves-Principles of Synthesis and Identification," R. Szostak, Van Nostrand Reinhold, New York, 1989, hereby incorporated by reference, and in other known references.

Nonzeolitic molecular sieves, which can also be referred to as nonaluminosilicate molecular sieves, metallosilicates, or zeotypes, are also suitable for use with the method of the present invention. These molecular sieves are generally synthesized to contain metallic components in place of some or all of the aluminum and/or silicon atoms. Typical metallic components include, but are not limited to boron, gallium, phosphorus, titanium, iron, cobalt, manganese, magnesium, and zinc. These nonzeolitic molecular sieves are of the zeolite structure types included in, but not limited to those found in "Atlas of Zeolite Structure Types," W. M. Meier and D. H. Olson, 1992, Butterworth-Heinemann, Boston, which is hereby incorporated by reference.

While substantially most, if not all molecular sieves are suitable for use with the method of the present invention, the preferred molecular sieves are synthetic zeolites, borosilicate, and gallosilicate, and more preferably, faujasite, zeolite beta, ZSM-5, and borosilicate.

The molecular sieves to be processed in accordance with the method of the present invention can generally contain as much as 1 percent by weight or more of one or more alkali metals. The most commonly encountered alkali metals in natural occurring and synthetic molecular sieves are sodium and potassium. It is the alkali metals described above that define the exchangeable sites and that are generally replaced utilizing the trivalent cation ion exchange method of the present invention. The extent of ion exchange to be performed is generally a function of the particular reactions desired in the catalytic process and the feedstock and operating condition constraints inherent to the process or processes for conducting these reactions.

The ion exchange method of the present invention utilizes an ion exchange solution comprising a trivalent cation, a trivalent cation complexing agent, and a hydroxide-producing component.

The trivalent cation is generally present with a suitable anion in the form of a trivalent metallic compound or salt. The trivalent cation can comprise any cations having a +3 valence state, including but not limited to aluminum, gallium, indium, thallium (III), iron (III), chromium (III), scandium, yttrium, cerium (III), lanthanum, praseodymium (III), neodymium (III), samarium, europium (III), gadolinium, terbium, dysprosium, holmium, erbium, thullium, ytterbium, and lutetium. The preferred trivalent cations are aluminum, gallium, iron (III), chromium (III), and the rare earth metals, with aluminum being most preferred.

It is important to note that identification of the level and extent of trivalent cation exchanged to the exchangeable site can be difficult to determine where the trivalent cation is the same metal present in the framework of the molecular sieve. For example, exchanging aluminum to the exchangeable site of a zeolite having framework aluminum can be difficult to monitor. When aluminum ion exchange is performed, some of the aluminum already present in the molecular sieve framework generally remains in the framework of the zeolite, some aluminum is removed from the framework of the zeolite, and some aluminum is exchanged from the ion exchange solution to the ion exchangeable sites. Under such circumstances, determining the contributions of each effect and particularly the origin of additional framework aluminum can be difficult. The mechanisms of the method of the present invention can best be observed and confirmed by ion-exchanging a first trivalent cation to the exchangeable sites on a molecular sieve having a different framework metal. In this manner, the level of framework metal and ion exchanged cation in the bulk of the molecular sieve may be analyzed more effectively.

The anion of the trivalent cation can be any of several anions such as, but not limited to acetate, bromate, bromide, chlorate, chloride, nitrate, stearate, sulfate, oxide, and hydroxide. The preferred anions are generally acetate, bromide, chloride, fluoride, nitrate, and sulfate, with the nitrate anion being most preferred.

A particularly common and useful trivalent cation and anion composition is aqueous aluminum nitrate. Where aluminum nitrate is the source of the trivalent cation, the preferred molar concentration of the aluminum nitrate ranges from about 0.001M to about 10M, preferably from about 0.001M to about 4M, more preferably from about 0.01M to about 2M, and most preferably from about 0.03M to about 1.5M for best results. Lower concentrations of aluminum nitrate are generally less cost effective for use with the present invention while higher concentrations can present solubility complications.

The trivalent cation complexing agent can comprise the alpha, beta, and gamma hydroxy- and amino-carboxylic acids and some crown ethers, as exemplified by lactic acid, tartaric acid, glycine, and 15-crown-5. Suitable hydroxycarboxylic acids can include, but are not limited to 2-hydroxypropionic acid, 2-hydroxyacetic acid, 2-hydroxybutanoic acid, and 2-hydroxypentanoic acid. The preferred hydroxycarboxylic acid is 2-hydroxypropionic acid or lactic acid. Suitable amino acids can include, but are not limited to alpha amino acid, beta amino acid, and gamma amino acid. An example of an amino acid suitable for use in the method of the present invention is glycine.

The preferred trivalent cation complexing agent is generally a sufficiently strong complexing agent such that the complexed trivalent cation that is formed, does not disassociate easily. For example, a complexed trivalent cation comprising an aluminum trivalent cation and an acetate anion generally forms a hydroxide at a temperature of about 90° C. to about 100° C. at an ion exchange solution pH of about 6. The hydroxide generally binds itself to the exterior of the molecular sieve and does not permit the aluminum trivalent cation to reach the ion exchange site.

The preferred trivalent cation complexing agent is generally not too strong of a complexing agent such that the complexing agent does not release the trivalent cation into the molecular sieve. For example, a complexed trivalent cation comprising an aluminum trivalent cation with a complexing agent such as ethylenediaminetetraacetic acid (EDTA) is particularly stable and is generally too strong of a complexing agent to release the aluminum trivalent cation into the molecular sieve.

For the reasons described hereabove, it is preferred that the complexed trivalent cation have a complexing stability constant, as measured by the equilibrium molar concentration of the product of the complexing reaction (i.e., for example, reaction G below) divided by the molar concentration of the reactants of the complexing reaction, of from about 2 to about 15, preferably from about 5 to about 12, and more preferably from about 5.5 to about 9.0 for best results. Therefore, the preferred trivalent cation complexing agent should be selected with respect to the trivalent cation, in a manner so as to effect a complexed trivalent cation having a complexing stability constant within the range described above.

It is also important that the trivalent cation complexing agent be selected in a manner, with respect to the trivalent cation, to form a complexed trivalent cation that can physically and dimensionally enter the pores of the molecular sieve. For example, the complex formed from complexing the aluminum trivalent cation with ethylenediaminetetraacetic acid (EDTA) described above produces a complex that may be too bulky in size to enter the pores of many molecular sieves.

The hydroxide-producing component can include any of several hydroxide-producing components including, but not limited to ammonium hydroxide, tetraalkylammonium hydroxide, and the Group I hydroxides. The preferred hydroxide-producing component is an aqueous solution of ammonium hydroxide.

While not wishing to be bound to any particular theory, it is believed that the complexing reaction of the trivalent cation with the trivalent cation complexing agent takes place generally in one of two manners. For larger pore molecular sieves such as those having 12 or more membered rings and where aluminum is the trivalent cation and lactic acid is the trivalent cation complexing agent, the trivalent cation may be complexed and enters the pores of the molecular sieve in varying extents of the following reaction:

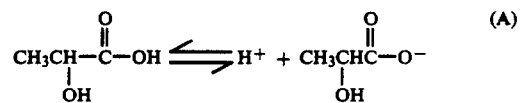

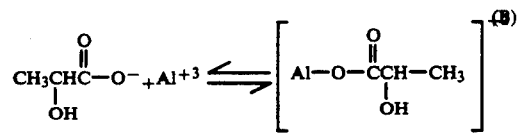

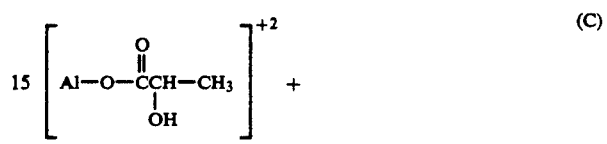

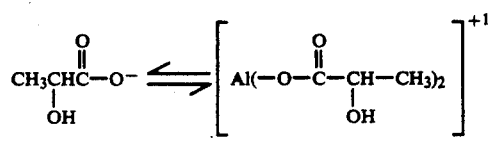

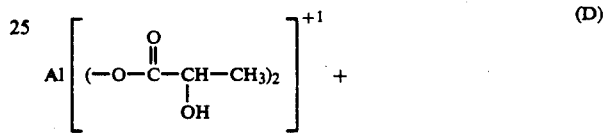

Reactions (B), (C), and (D) generally exist at an equilibrium concentration of each of the products of these reactions. The products of reactions (B), (C), and (D), for purposes of the present invention, are referred to as complexed trivalent cations.

For smaller pore molecular sieves such as those having 10 or less membered rings and where aluminum is the trivalent cation and lactic acid is the trivalent cation complexing agent, the trivalent cation may be complexing and entering the pores of the molecular sieve according to the following reaction:

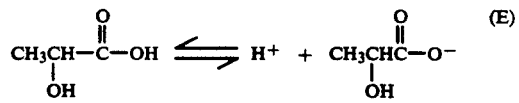

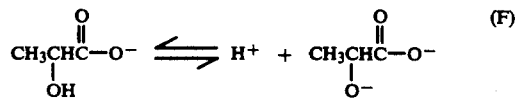

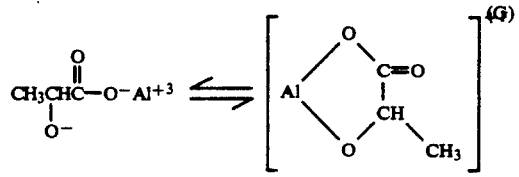

The product of reaction (G), for purposes of the present invention, is also referred to as a complexed trivalent cation. Equilibrium and Structural Studies of Silicon (IV) and Aluminum (III) in Aqueous Solution. 24. A potentiometric and $^{27}$Al NMR Study of Polynuclear Aluminum (III) Hydroxo Complexes with Lactic Acid by Marklund and Ohman, Acta Chemica Scandinavica 44 (1990) pages 228-234, provides detailed teachings as to solubility and equilibrium constants for lactic acid systems and is hereby incorporated by reference.

Once the complexed trivalent cation has been formed, the complexed trivalent cations generally diffuse through the pores of the molecular sieve to the exchangeable cation site in the molecular sieve. Note that the dianion lactate complex of the trivalent cations provides a complexed cation with a collective charge of +1 (Reaction G). This makes the complexed cation, aluminum, for example, appear to react with the exchangeable site in the same manner as a cation of Group I of the Periodic Table.

The ion exchange procedure, and particularly the final product analysis is simplified if the molecular sieve has been ion exchanged with the same cation -hydroxide used subsequently to neutralize the impregnation solution as shown below in reaction (H). In this case, the sodium form of the molecular sieve is ion exchanged with an ammonium cation containing salt as per the primary examples used hereabove.

$$NaMS\ (s) + NH_4^{+1}(sol) \rightarrow NH_4MS(s) + Na^{+1}(sol) \quad (H)$$

Designating the product of reaction (G) as $[Al(H_{-1})L]^{+1}$ wherein $(H_{-1})L$ represents the double ionization of both ionizable protons from lactic acid which generally provide the dianion of lactic acid, the ion exchange reaction becomes:

$$NH_4MS(s) + [Al(H_{-1})L]^{+1}(sol) \rightarrow Al(H_{-1})LMS(s) + NH_4^{+1}(sol) \quad (I)$$

The expelled cation is generally from a weak base and will not appreciably change the pH of the ion exchange solution. Generally, one mole of aluminum (i.e., 1 complexed equivalent) is added to the sieve for each equivalent of exchangeable site. After calcination, there will generally appear to be as much as three equivalents of aluminum per exchangeable site.

The trivalent cation complexing agent is generally selected in a manner such that the trivalent cation complex is easily created from the trivalent cation and the trivalent cation complexing agent in the ion exchange solution.

Since the trivalent cation is generally complexed in the manner described hereabove, the fundamental problem in the art of forming the hydroxide of the trivalent cation is substantially reduced. Without the trivalent cation complexing agent, trivalent cations, and particularly aluminum, colloidally form hydroxides which can precipitates from the ion exchange solution. Aluminum hydroxide typically precipitates from ion exchange solutions at a pH of about 4 or above, cannot enter the pores of the molecular sieve, and undesirably coats the surface of the molecular sieve rendering the molecular sieve less effective for many chemical reactions.

Therefore, the trivalent cation complexing reaction permits ion exchange of the molecular sieve at conditions that are optimum for facilitating the desired catalytic reaction. Where it is desired to facilitate effective ion exchange while minimizing acid leaching of framework metals from the molecular sieve, the preferred ion exchange solution pH generally ranges from about 4.0 to about 8.0, preferably from about 4.5 to about 7.5, and more preferably from about 4.5 to about 7.0 for best results. The targeted ion exchange solution pH is generally obtained by the controlled addition of the hydroxide-producing component. Excessive ion exchange solution pH can result in the formation of aluminum hydroxide, notwithstanding the presence of the complexing agent, due to the relatively weak complexing agent strength.

It is also generally desirable to control the molar ratio of the trivalent cation complexing agent to the trivalent cation. Suitable trivalent cation complexing agent to trivalent cation molar ratios generally range from about 0.01 to about 50, preferably from about 0.04 to about 25, more preferably from about 0.1 to about 10, and most preferably from about 0.6 to about 6 for best results. Lower trivalent cation complexing agent to trivalent cation molar ratios can result in the trivalent cation precipitating out of solution. Higher molar ratios can result in the dissolution of some of the trivalent cation from the exchangeable sites and less effective ion exchange. Moreover, higher molar ratios can also result in failure of the trivalent cation complex to release the trivalent cation into the ion exchange site.

The ion exchange method of the present invention can be performed by any of several methods known to those skilled in the art including methods disclosed in a wide variety of patents including U.S. Pat. Nos. 3,140,249, 3,140,251, and 3,140,253. Two particularly common techniques include aqueous ion exchange and impregnation.

The impregnation technique generally involves dissolving the trivalent cation in a suitable solvent, the trivalent cation complexing agent, and the hydroxide-producing component and impregnating this solution into the molecular sieve. The impregnation may be single or multiple. Incipient wetness techniques are generally preferred wherein just the amount of solution is utilized to just fill the pores of the molecular sieve. Suitable solvents can include water, alkanes, ketones, ethers, sulfoxides, and other solvents known to those skilled in the art. After impregnation, the molecular sieve is generally dried to remove the solvent. Mild calcination may also follow and is generally preferred.

The preferred ion exchange method is an aqueous ion exchange wherein the molecular sieve is contacted one or more times with a solution comprising the trivalent cation, the trivalent cation complexing agent, the hydroxide-producing component, and water. After ion exchange, the molecular sieve is dried to remove the solvent. Mild calcination may also follow and is generally preferred.

The ion exchange process conditions suitable for use with the method of the present invention generally include an ion exchange temperature ranging from about 1° C. to about 165° C., preferably from about 10° C. to about 120° C., more preferably from about 25° C. to about 100° C., and most preferably from about 60° C. to about 100° C. for best results. Suitable ion exchange pressures generally range from about 1 atmosphere to about 10 atmospheres, preferably from about 1 atmosphere to about 4 atmospheres, and more preferably from about 1 atmosphere to about 2 atmospheres for best results. Suitable ion exchange times generally range from a time of about 0.1 hours to about 24 hours, preferably from about 0.5 hours to about 20 hours, more preferably from about 1 hour to about 16 hours, and most preferably from about 1 hour to about 10 hours for best results.

Where the ion exchanged molecular sieve is calcined, suitable calcination temperatures generally range from about 250° C. to about 750° C., preferably from about 425° C. to about 650° C., and more preferably from about 500° C. to about 600° C. for best results.

The method of the present invention can be used to modify molecular sieves and catalysts for use with numerous refining, chemical, and other processes. The method is particularly useful for catalysts used in hydrocarbon conversion processes. Hydrocarbon conversion processes are generally processes comprising reactions in which carbon-containing compounds are changed to different carbon-containing compounds. Typical processes that can utilize catalysts processed with the method of the present invention generally include fluid catalytic cracking, hydrocracking, catalytic reforming, paraffin and olefin isomerization, lubricating oil dewaxing, alkylation, transalkylation, dehydrogenation, hydration, dehydration, polymerization, methanol conversion processes, ammonia synthesis, gas purification, oxidation, Fisher-Tropsch processes, and other hydrocarbon processes known to those skilled in the art that can utilize molecular sieve-based catalysts or particles.

The processes that can particularly benefit from the method of the present invention are those that are believed to have carbonium ion intermediates produced from acidic catalysts. This method of catalyst ion exchange provides more control over catalytic conversion and selectivity to given products. These processes include fluid catalytic cracking, hydrocracking, methanol conversion, catalytic reforming, lubricating oil dewaxing, alkylation, and aromatic, paraffin, and olefin isomerization. Other processes, from the groups described hereabove, can further and additionally benefit from the subject method of trivalent cation ion exchange where the exchanged trivalent cation is itself, the active catalytic site.

The molecular sieve modification method of the present invention is a clear improvement over the methods of the prior art.

The method of the present invention facilitates modification or ion exchange of a molecular sieve with trivalent cations while minimizing leaching of framework and exchanged metal components that can reduce catalyst activity and selectivity. Wherein the trivalent cation is aluminum, the method of the present invention can achieve increases in the level of exchangeable site aluminum, compared to prior art methods and calculated as a ratio by weight, of over 25 percent, of over 50 percent, of over 70 percent, and commonly of over 100 percent.

The method of the present invention facilitates trivalent ion exchange of molecular sieves at a pH above 4. Where prior art methods for trivalent cation exchange generally required a pH of less than 4 in order to insure that aluminum hydroxide does not precipitate from the ion exchange solution, the method of the present invention permits and utilizes a pH of greater than 4.0 and preferably from about 4.0 to about 8.0, in order to reduce framework and exchanged metal leaching. The method of the present invention can reduce the level of framework element losses, by weight, by more than 20 percent compared to prior art ion exchange methods, typically by more than 40 percent, commonly by more than 55 percent, and often by more than 60 percent.

The method of the present invention facilitates the ion exchange of any one of numerous trivalent cations into any one of numerous molecular sieves, while substantially simplifying the delicate acidity balance of ion exchange effectiveness, the precipitation of the trivalent cation hydroxide, and framework element leaching.

The present invention is described in further detail in connection with the following examples, it being understood that the same are for purposes of illustration and not limitation.

EXAMPLE 1

A crystalline AMS-1B borosilicate molecular sieve was prepared for ion exchange in accordance with the method of the present invention. Borosilicate was selected as the test sieve since borosilicate facilitates composition determination for performance analysis since the framework metal is different than the ion exchanged species. The crystalline AMS-1B borosilicate molecular sieve was crystallized from a solution consisting of 20,004 grams of distilled water, 500 grams of sodium hydroxide, 500 grams of boric acid, 7,202 grams of tetrapropyl ammonium bromide, and 4,001 grams of a silica sol (Ludox HS-40 manufactured by DuPont Corporation). The initial pH of the crystallization solution was 10.64. The colloidal solution poured into an 11.5 gallon crystallizer and crystallized for 7 days at 165° C. After crystallization, the sieve was filtered from the slurry, washed with about 48 liters of distilled water and filter dried.

Approximately 100 grams of the AMS-1B borosilicate molecular sieve prepared above was placed in each of two calcination dishes and program calcined in a calcination furnace. The program calcination sequence of events consisted of holding the calcination dishes at 110° C. for 4 hours, increasing the temperature from 110° C. to 537° C. over a period of 4 hours, holding the temperature at 537° C. for 4 hours, reducing the temperature from 537° C. to 110° C. over a period of 4 hours, and maintaining a temperature of 110° C. until the calcination dishes were removed from the furnace.

Approximately 212 grams of the program calcined borosilicate molecular sieve was ammonium ion exchanged with 102 grams of ammonium acetate in about 1,800 grams of distilled water for a period of about 5 hours at a temperature of about 90° C. to about 100° C. The exchanged sieve was filtered from the exchange solution, washed with about 0.4 liters of distilled water, and filter dried for about 12 hours.

All of the ammonium exchanged borosilicate molecular sieve was ammonium exchanged a second time with about 150 grams of ammonium acetate in about 3.6 liters of distilled water for about 5 hours at a temperature of about 90° C. to about 100° C. The exchanged sieve was filtered from the exchange solution, washed with about 0.4 liters of distilled water, and filter dried for a period of about 16 hours.

All of the twice-ammonium exchanged borosilicate molecular sieve was ammonium exchanged a third time with about 154 grams of ammonium acetate in about 3.6 liters of distilled water for about 5 hours at a temperature of about 90° C. to about 100° C. The exchanged sieve was filtered from the exchange solution, washed with about 0.6 liters of distilled water, and filter dried for a period of about 16 hours.

EXAMPLE 2

Approximately 12.1 grams of ammonium ion exchanged AMS-1B from Example 1, 20.1 grams of aluminum nitrate ($Al(NO_3)_3 \cdot 9H_2O$), 14.4 grams of 90 percent by weight lactic acid, and 10.3 grams of ammonium hydroxide were added to 800.0 grams of deionized water. The pH of the ion exchange solution was 4.09. The ion exchange was performed for about 5 hours at a temperature of from about 90° C. to about 100° C. The aluminum-exchanged sieve was filtered from the exchange solution, washed with about 0.2 liters of deionized water, and filter dried for about 16 hours. The dried solid was program calcined at 537° C. with the program described in Example 1. The calcined, aluminum-exchanged AMS-1B molecular sieve was analyzed by XPS (X-ray Fluorescence Spectroscopy) to have 2.7 atomic percent aluminum on the surface of the molecular sieve and by ICP (Inductive Coupled Plasma) to have 0.33 weight percent aluminum in the bulk phase. Detailed analytical results are provided in Table 1.

EXAMPLE 3

Approximately 12.1 grams of ammonium ion exchanged AMS-1B from Example 1, 20.2 grams of aluminum nitrate ($Al(NO_3)_3 \cdot 9H_2O$), 16.5 grams of 90 percent by weight lactic acid, and 12.1 grams of ammonium hydroxide were added to 800.0 grams of deionized water. The pH of the ion exchange solution was 4.52. The ion exchange was performed for about 5 hours at a temperature of from about 90° C. to about 100° C. The aluminum-exchanged sieve was filtered from the exchange solution, washed with about 0.2 liters of deionized water, and filter dried for about 12 hours. The dried solid was program calcined at 537° C. with the program described in Example 1. The calcined, aluminum-exchanged AMS-1B molecular sieve was analyzed by ICP to have 0.51 weight percent aluminum in the bulk phase. Detailed analytical results are provided in Table 1.

Complexing the aluminum cation and increasing the pH of the ion exchange solution from the 4.09 level of Example 2 to 4.52 resulted in a substantial increase in the bulk phase aluminum, compared to Example 2. This is believed to occur since increasing the ion exchange solution pH stabilizes the complex between the aluminum cation and the lactate anion which impedes the formation of aluminum hydroxide. Moreover, reduced leaching of framework boron compared to Example 2, may have preserved ion exchange sites for ion exchange.

EXAMPLE 4

Approximately 12.1 grams of ammonium ion exchanged AMS-1B from Example 1, 20.0 grams of aluminum nitrate ($Al(NO_3)_3 \cdot 9H_2O$), 14.6 grams of 90 percent by weight lactic acid, and 12.8 grams of ammonium hydroxide were added to 800.0 grams of distilled water. The pH of the ion exchange solution was 5.03. The ion exchange was performed for about 5 hours at a temperature of from about 90° C. to about 100° C. The aluminum-exchanged sieve was filtered from the exchange solution, washed with about 0.2 liters of deionized water, and filter dried for about 12 hours. The dried solid was program calcined at 537° C. with the program described in Example 1. The calcined, aluminum-exchanged AMS-1B molecular sieve was analyzed by XPS to have 5.9 atomic percent aluminum on the surface of the molecular sieve and by ICP to have 0.57 weight percent aluminum in the bulk phase. Detailed analytical results are provided in Table 1.

Complexing the aluminum cation and again increasing the pH of the ion exchange solution to a level of 5.03 resulted in a further increase in the bulk phase aluminum compared to Examples 2 and 3 for the reasons described in Example 3. The surface aluminum results for Example 4 were also higher than the result of Example 2. This is believed to have occurred since the presence of additional amounts of the hydroxide-producing component may have resulted in the production of more aluminum hydroxide. Therefore, while advantages in ion exchangeable site aluminum were gained from more stable cation-lactate complexes, additional aluminum and ammonium hydroxide were present in solution in the form of aluminum hydroxide, which generally precipitates on the surface of the molecular sieve.

EXAMPLE 5

Approximately 12.1 grams of ammonium ion exchanged AMS-1B from Example 1, 20.2 grams of aluminum nitrate ($Al(NO_3)_3 \cdot 9H_2O$), 14.4 grams of 90 percent by weight lactic acid, and 13.2 grams of ammonium hydroxide were added to 800.0 grams of deionized water. The pH of the ion exchange solution was 5.34. The ion exchange was performed for about 5 hours at a temperature of from about 90° C. to about 100° C. The aluminum-exchanged sieve was filtered from the exchange solution, washed with about 0.2 liters of deionized water, and filter dried for about 12 hours. The dried solid was program calcined at 537° C. with the program described in Example 1. The calcined, aluminum-exchanged AMS-1B molecular sieve was analyzed by XPS to have 8.4 atomic percent aluminum on the surface of the molecular sieve and by ICP to have 0.75 weight percent aluminum in the bulk phase. Detailed analytical results are provided in Table 1.

Complexing the aluminum cation and again increasing the pH of the ion exchange solution to a level of 5.34 weight percent resulted in a further increase in the bulk phase aluminum compared to Examples 2 through 4, for the reasons described in Example 3. The surface aluminum results for Example 5 were also substantially higher than the results of Examples 2 and 4. This may have occurred since there was more ammonium hydroxide in the ion exchange solution competing with lactate for the aluminum cations at a higher solution pH. This may have resulted in higher amounts of aluminum hydroxide precipitate. However, it is also important to note that Example 5 was the first aluminum exchange test performed which may have resulted in assorted experimental errors.

EXAMPLE 6

A similar analysis to that of Example 5, having a generally similar ion exchange solution pH but a different proportion of lactic acid and ammonium hydroxide to aluminum hydroxide, was performed to verify the above theories and the consistency and repeatability of the testing methods. Approximately 13.7 grams of ammonium ion exchanged AMS-1B from Example 1, 40.0 grams of aluminum nitrate ($Al(NO_3)_3 \cdot 9H_2O$), 32.8 grams of 90 percent by weight lactic acid, and 27.7 grams of ammonium hydroxide were added to 800.0 grams of deionized water. The pH of the ion exchange solution was 5.35. The ion exchange was performed for about 5 hours at a temperature of from about 90° C. to about 100° C. The aluminum-exchange sieve was filtered from the ion exchange solution, washed with about 0.2 liters of deionized water, and filter dried for about 12 hours. The dried solid was program calcined at 537° C. with the program described in Example 1. The calcined, aluminum-exchanged AMS-1B molecular sieve was analyzed by XPS to have 4.3 atomic percent aluminum on the surface of the molecular sieve and by ICP to have 0.89 weight percent aluminum in the bulk phase which agrees fairly closely with the results obtained in Example 5. Detailed analytical results are provided in Table 1.

Increasing the aluminum nitrate by a weight factor of 2, the ammonium hydroxide by a weight factor of 2.1, and the lactic acid by a weight factor of 2.3 while maintaining a nearly constant pH compared to that of Example 5, resulted in a slight increase in aluminum at the molecular sieve exchangeable sites. This is believed to have occured because there was a higher proportion of aluminum available in the ion exchange solution to exchange with the available exchange sites. The potential for experimental error in Example 5 may also account for some of the differences between the results reported in Examples 5 and 6.

EXAMPLE 7

Approximately 13.7 grams of ammonium ion exchanged AMS-1B from Example 1, 40.0 grams of aluminum nitrate ($Al(NO_3)_3 \cdot 9H_2O$), 32.8 grams of 90 percent by weight lactic acid, and 29.7 grams of ammonium hydroxide were added to 800.0 grams of deionized water. The pH of the ion exchange solution was 5.99. The ion exchange was performed for about 5 hours at a temperature of from about 90° C. to about 100° C. The aluminum-exchanged sieve was filtered from the exchange solution, washed with about 0.2 liters of deionized water, and filter dried for about 12 hours. The dried solid was program calcined at 537° C. with the program described in Example 1. The calcined, aluminum-exchanged AMS-1B molecular sieve was analyzed by XPS to have 3.0 atomic percent aluminum on the surface of the molecular sieve and by ICP to have 1.03 weight percent aluminum in the bulk phase. Detailed analytical results are provided in Table 1.

Complexing the aluminum cation and increasing the pH of the ion exchange solution from the 5.35 level of Example 6 to 5.99 resulted in an additional increase in the bulk phase aluminum, compared to Example 6. This is believed to occur since increasing the ion exchange solution pH stabilizes the complex between the aluminum cation and the lactate anion which impedes the formation of aluminum hydroxide. Examples 2 through 7 generally illustrate that as the ion exchange solution pH is increased, so is the degree of trivalent cation exchanged to the molecular sieve exchangeable sites. The principles above are further evidenced by the incremental reduction in surface aluminum over the molecular sieves of Examples 4 through 7. Examples 4 through 7 generally illustrate that with sufficient lactic acid to complex the trivalent cation, higher pH generally correlates to reduced percentages of trivalent cation on the surface of the molecular sieve. This is generally true until the presence of excessive hydroxide anions begins to favor the production of the trivalent cation hydroxide at or greater than about pH 7.5 to 8.0.

EXAMPLE 8

An ion exchange similar to those performed in Examples 2 through 7, was performed using neodymium (III) as the trivalent cation. Approximately 25.0 grams of ammoniun ion exchanged AMS-1B from Example 1, 43.8 grams of neodymium nitrate ($Nd(NO_3)_3 \cdot 9H_2O$), 32.7 grams of 90 percent by weight lactic acid, and 28.1 grams of ammonium hydroxide were added to 800.0 grams of deionized water. The pH of the ion exchange solution was 8.13. The ion exchange was performed for about 5 hours at a temperature of from about 90° C. to about 100° C. The neodymium-exchanged sieve was filtered from the exchange solution, washed with about 0.2 liters of deionized water, and filter dried for about 12 hours. The dried solid was program calcined at 537° C. with the program described in Example 1. The calcined, neodymium-exchanged AMS-1B molecular sieve was analyzed by ICP to have 15.3 weight percent neodymium in the bulk phase. The results of Example 8 are summarized in Table 1.

This Example illustrated that the presence of ammonium hydroxide and lactic acid with neodymium nitrate in a proportion to produce an ion exchange solution having a pH of 8.13, was excessively high in pH, resulting in the formation of neodymium hydroxide which substantially coated the catalyst, disrupted the testing procedure, and produced the above result.

EXAMPLE 9

A second ion exchange similar to that performed in Example 8 using neodymium (III) as the trivalent cation was performed at a lower ion exchange solution pH. Approximately 25.2 grams of ammonium ion exchanged AMS-1B from Example 1, 43.8 grams of neodymium nitrate ($Nd(NO_3)_3 \cdot 9H_2O$), 32.7 grams of 90 percent by weight lactic acid, and 20.5 grams of ammonium hydroxide were added to 800.0 grams of deionized water. The pH of the ion exchange solution was 5.64. The ion exchange was performed for about 5 hours at a temperature of from about 90° C. to about 100° C. The neodymium-exchanged sieve was filtered from the exchange solution, washed with about 0.2 liters of deionized water, and filter dried for about 12 hours. The dried solid was program calcined at 537° C. with the program described in Example 1. The calcined, neodymium-exchanged AMS-1B molecular sieve was analyzed by ICP to have 0.64 weight percent neodymium in the bulk phase. The results of Example 9 are summarized in Table 1.

The results of Example 9 indicate that reducing the ammonium hydroxide reduced the ion exchange solution pH and the level of neodymium hydroxide production resulting in successful trivalent cation ion exchange to the ion exchangeable sites of the molecular sieve.

EXAMPLE 10

An ion exchange similar to those performed in Examples 2 through 9, was performed using gallium as the trivalent cation. Approximately 20.0 grams of ammoniun ion exchanged AMS-1B from Example 1, 44.8 grams of gallium nitrate ($Ga(NO_3)_3 \cdot 9H_2O$), 43.0 grams of 90 percent by weight lactic acid, and 32.3 grams of ammonium hydroxide were added to 800.0 grams of deionized water. The pH of the ion exchange solution was 5.99. The ion exchange was performed for about 5 hours at a temperature of from about 90° C. to about 100° C. The gallium-exchanged sieve was filtered from the exchange solution, washed with about 0.2 liters of deionized water, and filter dried for about 12 hours. The dried solid was program calcined at 537° C. with the program described in Example 1. The calcined, gallium-exchanged AMS-1B molecular sieve was analyzed by ICP to have 2.03 weight percent gallium in the bulk phase. The results of Example 10 are summarized in Table 1.

phase. The results of Example 11 are summarized in Table 1.

Examples 10 and 11 illustrate that where the proportion of lactic acid and ammonium hydroxide to gallium nitrate are excessive, the cation-lactate complex can be too strong to release the trivalent cation into the ion exchangeable sites of the molecular sieve. Example 10 is a preferred method for Gallium exchange.

TABLE 1

| | EXAMPLE | | | | | | | | | |
|---|---|---|---|---|---|---|---|---|---|---|
| | 2 | 3 | 4 | 5 | 6 | 7 | 8 | 9 | 10 | 11 |
| EXCHANGE MIXTURE COMPOSITION | | | | | | | | | | |
| Distilled Water, gm | | 800.00 | 800.00 | 800.00 | | | | | | |
| Deionized Water, gm | 800.00 | | | | 800.00 | 800.00 | 800.00 | 800.00 | 800.00 | 800.00 |
| AMS-1B-1, gm | 12.1 | 12.1 | 12.1 | 12.1 | 13.7 | 13.7 | 25.0 | 25.2 | 20.0 | 20.0 |
| $Al(NO_3)_3 \cdot 9H_2O$, gm | 20.1 | 20.2 | 20.0 | 20.2 | 40.0 | 40.0 | | | | |
| $Nd(NO_3)_3 \cdot 9H_2O$, gm | | | | | | | 43.8 | 43.8 | | |
| $Ga(NO_3)_3 \cdot 9H_2O$, gm | | | | | | | | | 44.8 | 45.1 |
| Lactic Acid, gm | 14.4 | 16.5 | 14.6 | 14.4 | 32.8 | 32.8 | 32.7 | 32.7 | 43.0 | 105.3 |
| $NH_4OH$, gm | 10.3 | 12.1 | 12.8 | 13.2 | 27.7 | 29.6 | 28.1 | 20.5 | 32.3 | 58.2 |
| ION EXCHANGE SOLUTION PH | 4.09 | 4.52 | 5.03 | 5.34 | 5.35 | 5.99 | 8.13 | 5.64 | 5.99 | 6.10 |
| ION EXCHANGE MOLECULAR SIEVE COMPOSITION, WT. % | | | | | | | | | | |
| Silicon, Wt. % | 44.3 | 44.0 | 43.9 | 43.8 | | | | | | |
| Boron, Wt. % | 0.51 | 0.55 | 0.53 | 0.55 | | | | | | |
| Sodium, Wt. % | 0.0009 | 0.0008 | 0.0010 | 0.0023 | | | | | | |
| Aluminum, Wt. % | 0.33 | 0.51 | 0.57 | 0.75 | 0.89 | 1.03 | | | | |
| Neodymium, Wt. % | | | | | | | 15.3 | 0.64 | | |
| Gallium, Wt. % | | | | | | | | | 2.03 | 0.12 |
| TOTAL OXIDES, WT. % | 97.2 | 96.9 | 96.7 | 97.0 | | | | | | |
| BORON-ALUMINUM EQUIVALENCY | | | | | | | | | | |
| $Al(+3)$ | 0.037 | 0.057 | 0.064 | 0.083 | | | | | | |
| $Al(+2)(LACT)$ | 0.025 | 0.038 | 0.042 | 0.056 | | | | | | |
| $Al(+1)(LACT)^2$ | 0.012 | 0.019 | 0.021 | 0.028 | | | | | | |
| ALUMINUM-BORON MOLE EQUIVALENCY | | | | | | | | | | |
| $Al(+3)$ | 0.78 | 1.17 | 1.30 | 1.63 | | | | | | |
| $Al(+2)(LACT)$ | 0.52 | 0.78 | 0.87 | 1.09 | | | | | | |
| $Al(+1)(LACT-H)^2$ | 0.26 | 0.39 | 0.43 | 0.54 | | | | | | |
| SURFACT ALUMINUM-ATOMIC PERCENT | | | | | | | | | | |
| First Analysis- | | | | | | | | | | |
| Silicon, Wt. % | 93.7 | | 90.7 | 87.1 | 92.1 | 92.4 | | | | |
| Aluminum, Wt. % | 2.6 | | 5.9 | 8.4 | 4.3 | 3.0 | | | | |
| Boron, Wt. % | 3.6 | | 3.4 | 4.5 | 3.6 | 4.6 | | | | |
| Second Analysis- | | | | | | | | | | |
| Silicon, Wt. % | 95.9 | | 92.6 | 89.7 | 93.3 | 94.3 | | | | |
| Aluminum, Wt. % | 2.2 | | 5.1 | 7.4 | 3.8 | 1.5 | | | | |
| Boron, Wt. % | 1.9 | | 2.4 | 2.9 | 2.9 | 4.2 | | | | |

EXAMPLE 11

A second ion exchange similar to that performed in Example 10 using gallium as the trivalent cation was performed at a similar ion exchange solution pH to that of Example 10, but with a substantially higher proportion of lactic acid and ammonium hydroxide to gallium nitrate. Approximately 20.0 grams of ammoniun ion exchanged AMS-1B from Example 1, 45.1 grams of gallium nitrate ($Ga(NO_3)_3 \cdot 9H_2O$), 105.3 grams of 90 percent by weight lactic acid, and 58.2 grams of ammonium hydroxide were added to 800.0 grams of deionized water. The pH of the ion exchange solution was 6.10. The ion exchange was performed for about 5 hours at a temperature of from about 90° C. to about 100° C. The gallium-exchanged sieve was filtered from the exchange solution, washed with about 0.2 liters of deionized water, and filter dried for about 12 hours. The dried solid was program calcined at 537° C. with the program described in Example 1. The calcined, gallium-exchanged AMS-1B molecular sieve was analyzed by ICP to have 0.12 weight percent gallium in the bulk

EXAMPLE 12

A crystalline AMS-1B borosilicate molecular sieve was prepared for ion exchange utilizing methods known in the art, for comparison to the crystalline AMS-1B borosilicate molecular sieves ion exchanged in accordance with the method of the present invention. The borosilicate molecular sieve was prepared in a manner consistent with the method described in Example 1. The results of Example 12 are summarized in Table 2.

EXAMPLE 13

Approximately 6.0 grams of ammonium ion exchanged AMS-1B from Example 12 and 5.0 grams of aluminum nitrate ($Al(NO_3)_3 \cdot 9H_2O$) were added to 1800.1 grams of deionized water. The pH of the ion exchange solution was 3.55. The ion exchange was performed for about 5 hours at a temperature of from about 90° C. to about 100° C. The aluminum-exchanged sieve was filtered from the exchange solution, washed with about 0.2 liters of deionized water, and filter dried for about 16 hours. The dried solid was program calcined at 537° C. with the program described in Example 1.

The calcined, aluminum-exchanged AMS-1B molecular sieve was analyzed by ICP (Inductive Coupled Plasma) to have 0.22 weight percent boron in the bulk phase, a substantial reduction of about 62 percent from that of the molecular sieve of Example 12. The reduction in framework boron is largely a result of leaching caused by the acidic ion exchange solution. Detailed analytical results are provided in Table 2.

EXAMPLE 14

Approximately 12.1 grams of ammonium ion exchanged AMS-1B from Example 12 and 20.7 grams of aluminum nitrate $(Al(NO_3)_3 \cdot 9H_2O)$ were added to 1800.2 grams of deionized water. The pH of the ion exchange solution was 3.19. The ion exchange was performed for about 5 hours at a temperature of from about 90° C. to about 100° C. The aluminum-exchanged sieve was filtered from the exchange solution, washed with about 0.2 liters of deionized water, and filter dried for about 16 hours. The dried solid was program calcined at 537° C. with the program described in Example 1.

The calcined, aluminum-exchanged AMS-1B molecular sieve was analyzed by ICP (Inductive Coupled Plasma) to have 0.23 weight percent boron in the bulk phase, a substantial reduction of about 60 percent from that of the molecular sieve of Example 12. The aluminum content of the bulk phase was lower than that of Example 13. This is believed to have occurred since the ion exchange solution pH was lower, resulting in additional framework element leaching, a greater reduction in framework boron, and a subsequent reduction in ion exchangeable sites. Detailed analytical results are provided in Table 2.

EXAMPLE 15

Approximately 12.1 grams of ammonium ion exchanged AMS-1B from Example 12 and 20.1 grams of aluminum nitrate $(Al(NO_3)_3 \cdot 9H_2O)$ were added to 1800.2 grams of deionized water. The pH of the ion exchange solution was 3.10. The ion exchange was performed for about 5 hours at a temperature of from about 90° C. to about 100° C. The aluminum-exchanged sieve was filtered from the exchange solution, washed with about 0.2 liters of deionized water, and filter dried for about 16 hours. The dried solid was program calcined at 537° C. with the program described in Example 1.

The calcined, aluminum-exchanged AMS-1B molecular sieve was analyzed by ICP (Inductive Coupled Plasma) to have 0.24 weight percent boron in the bulk phase, a substantial reduction of about 59 percent from that of the molecular sieve of Example 12. The aluminum content of the bulk phase was lower than that of Examples 13 and 14. This again is believed to have occurred since the ion exchange solution pH was lower than the ion exchange solutions of Examples 13 and 14, resulting in additional framework element leaching, a greater reduction in framework boron, and a subsequent reduction in ion exchangeable sites. Detailed analytical results are provided in Table 2.

TABLE 2

| | EXAMPLE | | | |
|---|---|---|---|---|
| | 12 | 13 | 14 | 15 |
| EXCHANGE MIXTURE COMPOSITION | | | | |
| Deionized Water, gm | | 1800.1 | 1800.2 | 1800.2 |
| AMS-1B-1, gm | | 6.0 | 12.1 | 12.1 |
| $Al(NO_3)_3 \cdot 9H_2O$, gm | | 5.0 | 20.7 | 20.1 |
| ION EXCHANGE SOLUTION PH | | 3.55 | 3.19 | 3.10 |
| ION EXCHANGED MOLECULAR SIEVE COMPOSITION, WT. % | | | | |
| Silicon, Wt. % | 41.9 | 42.5 | 42.7 | 43.0 |
| Boron, Wt. % | 0.58 | 0.22 | 0.23 | 0.24 |
| Aluminum, ppm | 357 | 2950 | 2380 | 2300 |
| ION EXCHANGED MOLECULAR SIEVE COMPOSITION, WT. % (OXIDE) | | | | |
| Silicon, Wt. % (Oxide) | 92.50 | 93.73 | 94.17 | 94.83 |
| Boron, Wt. % (Oxide) | 2.37 | 0.90 | 0.94 | 0.90 |
| TOTAL OXIDES, WT. % | 94.87 | 94.62 | 95.11 | 95.81 |

Other embodiments of the invention will be apparent to those skilled in the art from a consideration of this specification or from practice of the invention disclosed herein. It is intended that this specification be considered as exemplary only with the true scope and spirit of the invention being indicated by the following claims.

That which is claimed is:

1. A method for the nondestructive trivalent cation ion exchange of molecular sieves comprising ion exchanging at least one molecular sieve with at least one trivalent cation, wherein said ion exchange is performed at ion exchange conditions with an ion exchange solution comprising said trivalent cation, a trivalent cation complexing agent comprising at least one member selected from the group consisting of alpha hydroxy-carboxylic acid, alpha amino-carboxylic acid, beta hydroxy-carboxylic acid, beta amino-carboxylic acid, gamma hydroxy-carboxylic acid, gamma amino-carboxylic acid, lactic acid, tartaric acid, glycine, and 15-crown-5, and a suitable amount of a hydroxide-producing component to form an ion exchange solution having a pH ranging from about 4 to about 8.

2. The method of claim 1 wherein at least one of said molecular sieves is a zeolite.

3. The method of claim 2 wherein said zeolite comprises at least one member selected from the group consisting of mordenite, faujasite, beta zeolite, and ZSM-5.

4. The method of claim 1 wherein said molecular sieve is at least one member selected from the group consisting of gallosilicate and borosilicate.

5. The method of claim 1 wherein at least one of said trivalent cations is selected from the group consisting of aluminum, gallium, indium, thallium (III), iron (III), chromium (III), scandium, yttrium, cerium (III), lanthanum, praseodymium (III), neodymium (III), samarium, europium (III), gadolinium, terbium, dysprosium, holmium, erbium, thullium, ytterbium, and lutetium.

6. The method of claim 1 wherein at least one of said trivalent cations is selected from the group consisting of aluminum, gallium, iron (III), chromium (III), and the rare earth metals.

7. The method of claim 5 wherein at least one of said trivalent cations is in the presence of one or more of the anions selected from the group consisting of acetate, bromide, chloride, fluoride, nitrate, and sulfate.

8. The method of claim 1 wherein said trivalent cation complexing agent has a complexing stability constant ranging from about 2 to about 15.

9. The method of claim 1 wherein said trivalent cation complexing agent is at least one member selected from the group consisting of 2-hydroxypropionic acid, 2-hydroxyacetic acid, 2-hydroxybutanoic acid, 2-hydroxypentanoic acid, 3-hydroxybutanoic acid, and 3-hydroxypentanoic acid.

10. The method of claim 1 wherein said trivalent cation complexing agent is 2-hydroxypropionic acid.

11. The method of claim 1 wherein said hydroxide-producing component is at least one member selected from the group consisting of ammonium hydroxide, tetraalkylammonium hydroxide, and the Group I metal hydroxides.

12. The method of claim 1 wherein said hydroxide-producing component is ammonium hydroxide and said ammonium hydroxide is added to said ion exchange solution in an amount and concentration for providing an ion exchange solution pH in the range of from about 4.5 to about 7.0.

13. The method of claim 1 wherein said trivalent cation is aluminum, said trivalent cation complexing agent is 2-hydroxypropionic acid, and said alkaline component is ammonium hydroxide.

14. A method for the nondestructive aluminum ion exchange of molecular sieves comprising ion exchanging at least one molecular sieve with an aluminum cation, wherein said ion exchange is performed at ion exchange conditions with an ion exchange solution comprising said aluminum cation, a trivalent cation complexing agent comprising at least one member selected from the group consisting of 2-hydroxypropionic acid, 2-hydroxyacetic acid, 2-hydroxybutanoic acid, 2-hydroxypentanoic acid, 3-hydroxybutanoic acid, and 3-hydroxypentanoic acid, and a suitable amount of ammonium hydroxide to form an ion exchange solution having a pH ranging from about 4.5 to about 7.0.

15. The method of claim 14 wherein said trivalent cation complexing agent has a complexing stability constant ranging from about 2 to about 15.

16. The method of claim 14 wherein said ion exchange conditions comprise an ion exchange temperature ranging from about 10° C. to about 120° C., an ion exchange pressure ranging from about 1 atmosphere to about 4 atmospheres, and an ion exchange time ranging from about 0.25 hours to about 20 hours.

17. A method for the nondestructive aluminum ion exchange of molecular sieves comprising ion exchanging at least one molecular sieve with an aluminum cation, wherein said ion exchange is performed at ion exchange conditions with an ion exchange solution comprising said aluminum cation, a trivalent cation complexing agent comprising 2-hydroxypropionic acid, and a suitable amount of ammonium hydroxide to form an ion exchange solution having a pH ranging from about 4.5 to about 7.0.

18. The method of claim 17 wherein said aluminum cation is provided in an aqueous mixture having an aluminum cation molar concentration ranging from about 0.001 to about 4.0.

19. The method of claim 17 wherein said molar ratio of said trivalent cation complexing agent to said aluminum cation ranges from about 0.04 to about 25.

20. The method of claim 17 wherein said ion exchange conditions comprise an ion exchange temperature ranging from about 10° C. to about 120° C., an ion exchange pressure ranging from about 1 atmosphere to about 4 atmospheres, and an ion exchange time ranging from about 0.25 hours to about 20 hours.

* * * * *